(12) United States Patent
Mileski

(10) Patent No.: US 8,570,227 B1
(45) Date of Patent: Oct. 29, 2013

(54) HIGH-FREQUENCY TRANSMIT ANTENNA SYSTEM

(75) Inventor: Paul M. Mileski, Mystic, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 177 days.

(21) Appl. No.: 13/233,339

(22) Filed: Sep. 15, 2011

(51) Int. Cl.
H01Q 1/00 (2006.01)

(52) U.S. Cl.
USPC .......................................... 343/722; 343/850

(58) Field of Classification Search
USPC .......................................... 343/722, 850, 852
See application file for complete search history.

(56) References Cited

U.S. PATENT DOCUMENTS

| 6,784,744 | B2 * | 8/2004 | Tichauer | 330/285 |
| 7,804,454 | B1 * | 9/2010 | Mileski | 343/722 |
| 2007/0249304 | A1 * | 10/2007 | Snelgrove et al. | 455/127.2 |
| 2010/0277248 | A1 * | 11/2010 | McClain et al. | 331/108 R |

* cited by examiner

Primary Examiner — Hoanganh Le
(74) Attorney, Agent, or Firm — James M. Kasischke; Jean-Paul A. Nasser; Michael P. Stanley

(57) ABSTRACT

A transmit antenna system includes active transmit electronics. A transistor has its gate coupled to a pulse generator for receiving the voltage pulses produced thereby. A coupled inductor is coupled to the transistor's drain. A tuning capacitor is coupled to the coupled inductor. An antenna is coupled to the coupled inductor and tuning capacitor. A choke inductor is coupled to the coupled inductor and a direct current voltage source. During each of the voltage pulses of the pulse generator, a resonant circuit is defined where parameters of the resonant circuit include resistance and capacitance of the antenna, capacitance of the tuning capacitor, inductance of the coupled inductor, and capacitance of the transistor. The resonant circuit is configured such that a resonant frequency thereof is equal to the pulse frequency of the pulse generator.

13 Claims, 2 Drawing Sheets

HIGH-FREQUENCY TRANSMIT ANTENNA SYSTEM

STATEMENT OF GOVERNMENT INTEREST

The invention described herein may be manufactured and used by or for the Government of the United States of America for governmental purposes without the payment of any royalties thereon or therefore.

CROSS-REFERENCE TO RELATED PATENT APPLICATIONS

None.

BACKGROUND OF THE INVENTION (1) Field of the Invention

The present invention relates generally to antennas, and more particularly to a high-frequency transmit antenna system for over the horizon communication.

(2) Description of the Prior Art

The use of high frequencies between 2 MHz and 30 MHz to provide long distance communications is well known in the art. Ranges of thousands of miles are supported using skywave propagation and lesser ranges on the order 100 miles are supported using surface wave propagation over sea water. Suitable antennas are well known in the art and include standard types such as simple dipoles and monopoles along with larger types such as the Yagi-Uda antenna and log-periodic antenna which provide improved performance (i.e., greater gain or bandwidth or both). Since these wavelengths are quite large (i.e., 150 meters at 2 MHz and 10 meters at 30 MHz), effective communications using these well-known antennas requires their dimensions to be suitably large and, ideally, resonant (i.e., wavelength for the dipole and ¼ wave for the monopole). These dimensions unfortunately are not compatible with many applications such as small mobile platforms (e.g., "man pack" or hand held devices) and small marine platforms (e.g., unmanned buoys or vehicles).

The use of electrically-small antenna structures to meet size requirements typically uses passive matching networks to "tune" these structures such that they present a good match to standard 50-ohm transmitters at the desired operating frequency. The drawbacks to this traditional approach include poor efficiency, low bandwidth, and a high susceptibility to small environmental changes (e.g., proximity to a changing waterline or adjacent object such as a structure or person). These drawbacks become more problematic as the desired antenna structure is made smaller and the subsequent departure from the standard 50-ohm transmitter impedance increases.

In an effort to address some of these drawbacks, U.S. Pat. No. 7,804,454 entitled "Active High Frequency Transmitter Antenna Assembly" to Paul M. Mileski, describes an antenna system that utilizes an active electronic circuit close to the antenna structure that overcomes the drawbacks of a passive matching network in order to provide a highly unconventional Ultra-Wide-Band (UWB) signal as part of a wide-band pulse modulated communication system. The active transmit electronics improve the efficiency, bandwidth, and flexibility of the electrically-small antenna system. However, the antenna system does not have the ability to transmit conventional relatively narrow band (or non UWB) high duty cycle signals necessary to support common modulation types such as Phase Shift Keying (PSK) and Frequency Shift Keying (FSK).

SUMMARY OF THE INVENTION

Accordingly, it is an object of the present invention to provide a high-frequency transmit antenna system.

Another object of the present invention is to provide a transmit antenna system that provides over the horizon communications at high frequencies between 10 MHz and 30 MHz.

Other objects and advantages of the present invention will become more obvious hereinafter in the specification and drawings.

In accordance with the present invention, a transmit antenna system includes a pulse generator outputting a series of voltage pulses with a pulse frequency associated therewith. A transistor has its gate coupled to the pulse generator for receiving the voltage pulses. A coupled inductor is coupled to the transistor's drain. A tuning capacitor is coupled to the coupled inductor. An antenna is coupled to the coupled inductor and tuning capacitor. A choke inductor is coupled to the coupled inductor and a direct current voltage source. During each of the voltage pulses of the pulse generator, a resonant circuit is defined where parameters of the resonant circuit include resistance and capacitance of the antenna, capacitance of the tuning capacitor, inductance of the coupled inductor, and capacitance of the transistor. The resonant circuit is configured such that a resonant frequency thereof is equal to the pulse frequency of the pulse generator.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
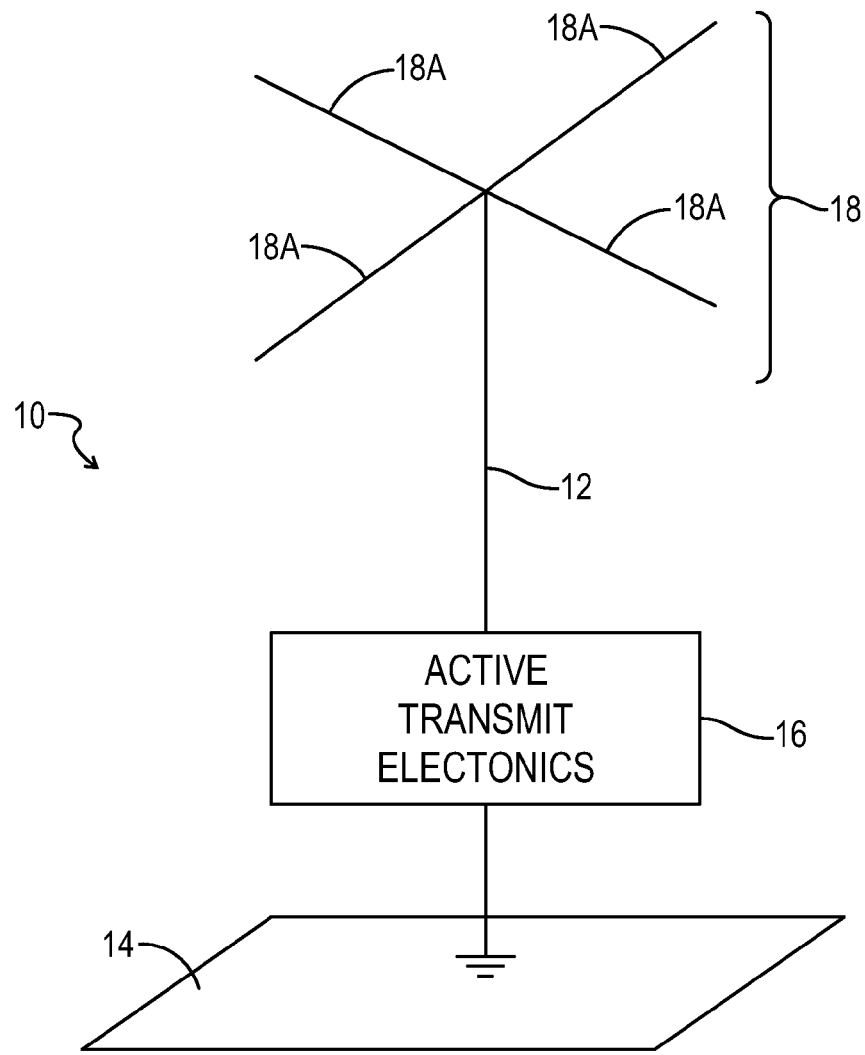
FIG. 1 is a top-level schematic view of a transmit antenna system in accordance with an embodiment of the present invention.

Referring now to the drawings and more particularly to FIG. 1, a transmit system in accordance with an embodiment of the present invention is shown and is referenced generally by numeral 10. Antenna system 10 includes a relatively short monopole antenna 12 ranging from about one to six feet in length. Antenna 12 can be an adjustable in length (e.g., a telescoping antenna) to provide for performance tuning as will be explained later below. Antenna 12 is fed against a ground plane 14 such as sea water with active transmit electronics 16 located near the base of antenna 12 or at the antenna feed. Antenna 12 utilizes a capacitive "top hat" assembly 18 that can be four horizontal and radially-extending wires 18A arranged as a "cross" centered at the top of antenna 12. Such capacitive "top hat" assemblies are well known in the art.

Figure 2:
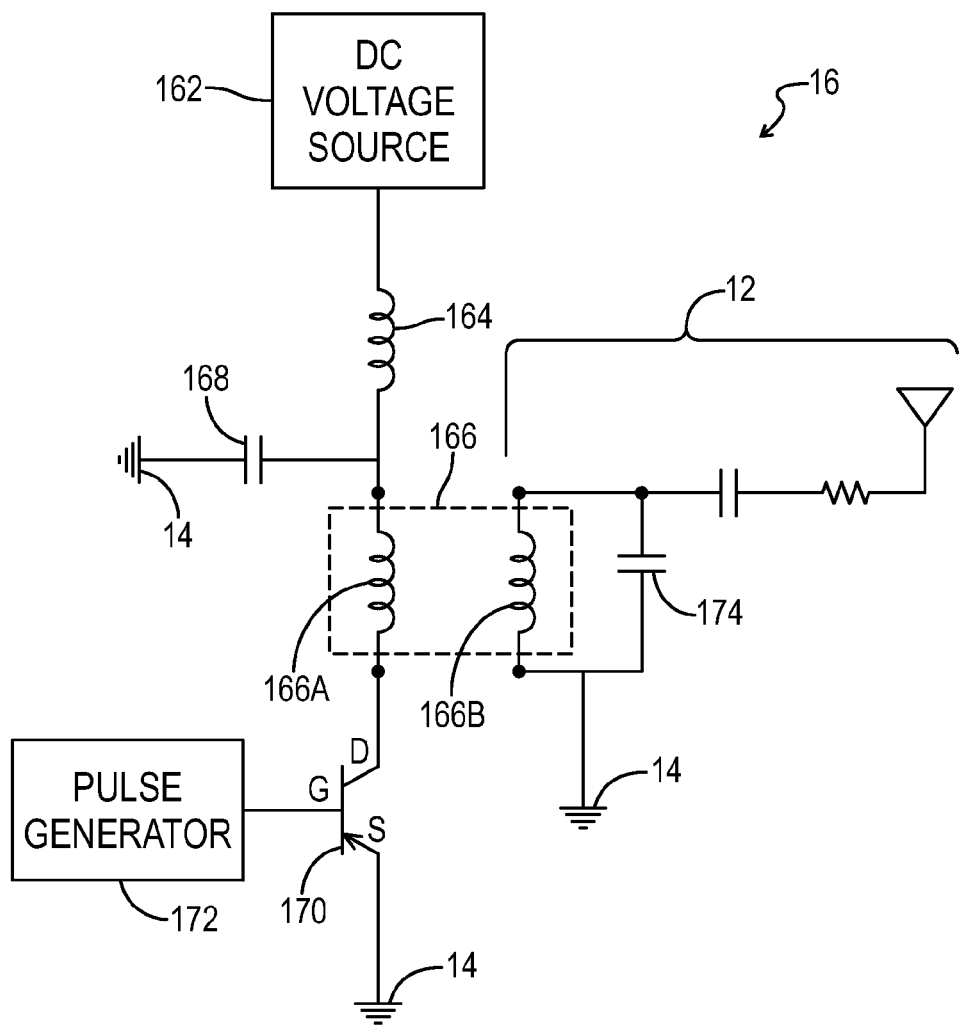
FIG. 2 is a schematic view of an embodiment of the active transmit electronics used in the transmit antenna system.

Antenna system 10 utilizes solid-state active transmit electronics 16 to allow antenna 12 to transmit narrow-band and high duty cycle signals necessary to support common modulation types such as Phase Shift Keying (PSK) and Frequency Shift Keying (FSK). Referring now to FIG. 2, an embodiment of active transmit electronics 16 (coupled to antenna 12) is illustrated schematically. A direct current (DC) voltage source 162 is joined to one contact of a radio frequency choke inductor 164. DC voltage source 162 can be any voltage source producing a voltage level required by antenna 12 and within the handling capacity of the elements of active transmit electronics 16. For example, for mobile applications, DC voltage source 162 could be realized by low-voltage batteries coupled to a DC-DC converter that boosts voltage output. A coupled inductor 166 is joined to the other contact of choke inductor 164. A bypass capacitor 168 is coupled between choke inductor 164, coupled inductor 166, and ground 14. Choke inductor 164 and bypass capacitor 168 provide filtering that minimizes the peak current presented to DC voltage source 162. Coupled inductor 166 is further coupled to the drain "D" of a transistor 170 which can be a field effect transistor (FET). The source "S" of transistor 170 is coupled to ground 14. The gate "G" of transistor 170 is coupled to a pulse generator 172 which can be a short duty cycle pulse generator (i.e. a signal source that provides a signal as a series of continuous pulses whose width is much smaller than the time between pulses; in the current embodiment the time between pulses is actually 1/operating frequency of the antenna and the width of the pulses is as small as possible while compatible with the "responsiveness" of the transistor) operating at the actual transmit frequency of antenna 12 as will be explained later below.

As is known in the art, coupled inductor 166 is defined by two distinct inductors, i.e., a first inductor 166A in proximity to a second inductor 166B. Inductors 166A and 166B are close enough they are "coupled" together by generated magnetic fields as current flows through to thereby define a "mutual inductance" which is the inductance of inductor 166A coupled to inductor 166B. In terms of active transmit electronics 16, one contact of inductor 166A is coupled to choke inductor 164 and bypass capacitor 168, while the other contact of inductor 166A is coupled to the drain of transistor 170. Inductor 166B (forming the output of coupled inductor 166) has a tuning capacitor 174 coupled across its contacts to thereby define a tuning circuit that is also coupled to ground 14. Antenna 12 is coupled to the output of coupled inductor 166. Antenna 12 can be modeled as a capacitor in series with a resistor as shown.

In operation, pulse generator 172 generates a continuous series of voltage pulses that are narrow. To conserve power, the pulse width is chosen to be as short as possible while still allowing transistor 170 to be operationally responsive. The time between each pulse is chosen to be the period of the desired transmit frequency of antenna 12 (or 1/transmitter frequency). The output of pulse generator 172 acts as an impulse drive for transistor 170. That is, transistor 170 is turned "on" during each short voltage pulse. Since the pulse width is narrow, transistor 170 wastes very little power in transition to the "on" state or in the "on" state. When in the "on" state, transistor 170 provides a high-amplitude and short-duration current pulse through the "primary" of coupled inductor 166. The "primary" of coupled inductor 166 is defined as the mutual inductance provided by inductors 166A and 166B when they are magnetically coupled to each other.

The impulse current pulse provided by transistor 170 to coupled inductor 166 is stored in the primary of coupled inductor 166 where the momentarily-generated magnetic field from inductor 166A is coupled to inductor 166B. By virtue of the pulsed impulse current, the magnetic field is rapidly changing thereby producing a rapid change in current at the output of coupled inductor 166. The rapidly-changing output current of coupled inductor 166 flows through antenna 12 as well as tuning capacitor 174 and back through inductor 166B. During the time of the impulse current pulse, the entire circuit of active transmit electronics 16 consists of antenna 12, tuning capacitor 174, inductor 166B, the primary of coupled inductor 166, and the capacitance associated with transistor 170. The corresponding circuit parameters associated with this circuit are the resistance and capacitance of antenna 12, capacitance of tuning capacitor 14, inductance of inductor 166B, the mutually coupled inductance of the primary of coupled inductor 166, and the capacitance of transistor 170. Since this circuit is "created" with each impulse current pulse, the circuit can be thought of as a resonant circuit whose resonant frequency is equal to that of the impulse current which, in turn, is equal to the pulse frequency of pulse generator 172. Thus, the transmit frequency of antenna 12 is equal to the pulse frequency of pulse generator 172 which, for high-frequency applications, can be set between 10-30 MHz with the resonant circuit parameters being selected to support the desired transmit frequency.

The parameters associated with coupled inductor 166 must be chosen to provide an adequate amount of mutual coupling. That is, too much mutual coupling combined with the typically high capacitance of transistor 170 lowers the quality factor of the created resonant circuit. However, too little mutual coupling causes the output of coupled inductor 166 to be small and useless.

The advantages of the present invention are numerous. Narrow band, high-frequency transmissions for over the horizon communication are supported by the transmit antenna described herein. The active transmit electronics are small solid-state electronics that are placed close to the antenna feed thereby providing for a compact antenna design. Tuning of the antenna can be provided using an adjustable-length antenna and the tuning capacitor coupled to the electronics' coupled inductor. The length of the antenna can be small compared to the wavelength due to the impedance matching effect of the active electronics. The bandwidth and efficiency are also improved compared to that using a passive matching network.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A transmit antenna system, comprising:
 a pulse generator outputting a series of voltage pulses with a pulse frequency associated therewith;
 a transistor having a gate coupled to said pulse generator for receiving said voltage pulses, said transistor further having a drain and a source;
 a coupled inductor having a first inductor and a second inductor in proximity to said first inductor, said first inductor having a first contact coupled to said drain and having a second contact, said second inductor having a first contact and a second contact;
 a tuning capacitor coupled to each of said first contact and said second contact associated with said second inductor to thereby define a tunable inductor circuit;
 an antenna coupled to said tunable inductor circuit;
 a choke inductor having a first contact coupled to said second contact associated with said first inductor, said choke inductor further having a second contact;
 a direct current voltage source having a positive terminal coupled to said second contact associated with said choke inductor, said voltage source further having a ground terminal coupled to said source of said transistor;
 wherein, during each of said voltage pulses, a resonant circuit is defined wherein parameters of said resonant circuit include resistance and capacitance of said antenna, capacitance of said tuning capacitor, inductance of said second inductor, a mutually coupled inductance of said first inductor and said second inductor, and capacitance of said transistor; and wherein said resonant circuit is configured such that a resonant frequency thereof is equal to said pulse frequency of said pulse generator.

2. A transmit antenna as in claim 1, wherein said antenna comprises a monopole antenna.

3. A transmit antenna as in claim 1, wherein said antenna comprises an adjustable-length antenna.

4. A transmit antenna as in claim 1, wherein said pulse frequency is between 10 and 30 MHz.

5. A transmit antenna as in claim 1, wherein said transistor comprises a field effect transistor.

6. A transmit antenna system, comprising:
a pulse generator outputting a series of voltage pulses with a pulse frequency associated therewith;
a transistor having a gate coupled to said pulse generator for receiving said voltage pulses, said transistor further having a drain and a source;
a coupled inductor coupled to said drain;
a tuning capacitor coupled to said coupled inductor;
an antenna coupled to said coupled inductor and said tuning capacitor;
a choke inductor coupled to said coupled inductor;
a direct current voltage source coupled to said choke inductor;
wherein, during each of said voltage pulses, a resonant circuit is defined wherein parameters of said resonant circuit include resistance and capacitance of said antenna, capacitance of said tuning capacitor, inductance of said coupled inductor, and capacitance of said transistor; and
wherein said resonant circuit is configured such that a resonant frequency thereof is equal to said pulse frequency of said pulse generator.

7. A transmit antenna as in claim 6, wherein said antenna comprises a monopole antenna.

8. A transmit antenna as in claim 6, wherein said antenna comprises an adjustable-length antenna.

9. A transmit antenna as in claim 6, wherein said pulse frequency is between 10 and 30 MHz.

10. A transmit antenna as in claim 6, wherein said transistor comprises a field effect transistor.

11. A transmit antenna system, comprising:
a pulse generator outputting a series of voltage pulses with a pulse frequency between 10 and 30 MHz associated therewith;
a field effect transistor having a gate coupled to said pulse generator for receiving said voltage pulses, said transistor further having a drain and a source;
a coupled inductor having a first inductor and a second inductor in proximity to said first inductor, said first inductor having a first contact coupled to said drain and having a second contact, said second inductor having a first contact and a second contact;
a tuning capacitor coupled to each of said first contact and said second contact associated with said second inductor to thereby define a tunable inductor circuit;
an antenna coupled to said tunable inductor circuit;
a choke inductor having a first contact coupled to said second contact associated with said first inductor, said choke inductor further having a second contact;
a direct current voltage source having a positive terminal coupled to said second contact associated with said choke inductor, said voltage source further having a ground terminal coupled to said source of said transistor;
wherein, during each of said voltage pulses, a resonant circuit is defined wherein parameters of said resonant circuit include resistance and capacitance of said antenna, capacitance of said tuning capacitor, inductance of said second inductor, a mutually coupled inductance of said first inductor and said second inductor, and capacitance of said transistor; and
wherein said resonant circuit is configured such that a resonant frequency thereof is equal to said pulse frequency of said pulse generator.

12. A transmit antenna as in claim 11, wherein said antenna comprises a monopole antenna.

13. A transmit antenna as in claim 11, wherein said antenna comprises an adjustable-length antenna.

* * * * *